(12) United States Patent
Yamada et al.

(10) Patent No.: US 6,639,436 B2
(45) Date of Patent: Oct. 28, 2003

(54) SEMICONDUCTOR INTEGRATED CIRCUIT WITH FUNCTION TO START AND STOP SUPPLY OF CLOCK SIGNAL

(75) Inventors: Yoshikazu Yamada, Kawasaki (JP); Masami Kanasugi, Kawasaki (JP); Shoji Taniguchi, Kawasaki (JP); Koichi Kuroiwa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/097,619

(22) Filed: Mar. 15, 2002

(65) Prior Publication Data

US 2003/0042972 A1 Mar. 6, 2003

(30) Foreign Application Priority Data

Aug. 28, 2001 (JP) ........................................ 2001-258710

(51) Int. Cl.[7] ................................................ H03L 7/00
(52) U.S. Cl. ........................................ 327/142; 327/297
(58) Field of Search ................................ 327/142, 165, 327/166, 291, 293, 295, 297

(56) References Cited

U.S. PATENT DOCUMENTS

| | | | | |
|---|---|---|---|---|
| 5,834,961 A | * | 11/1998 | Hillan et al. | 327/295 |
| 6,020,774 A | * | 2/2000 | Chiu et al. | 327/295 |
| 6,462,599 B2 | * | 10/2002 | Nitta et al. | 327/292 |

FOREIGN PATENT DOCUMENTS

| | | |
|---|---|---|
| EP | 1 058 180 A2 | 12/2000 |
| JP | 2000-29560 | 1/2000 |
| JP | 2000-293504 | 10/2000 |
| JP | 2000-347761 | 12/2000 |

* cited by examiner

*Primary Examiner*—Jeffrey Zweizig (57) ABSTRACT

A semiconductor integrated circuit includes a plurality of functional blocks, each of which starts and stops an operation thereof in response to assertion and negation, respectively, of a corresponding command signal, a clock generation circuit which generates a clock signal, a clock control circuit which starts supplying the clock signal to each of the functional blocks in response to the assertion of the corresponding command signal, and stops supplying the clock signal to each of the functional blocks in response to the negation of the corresponding command signal.

9 Claims, 6 Drawing Sheets

SEMICONDUCTOR INTEGRATED CIRCUIT WITH FUNCTION TO START AND STOP SUPPLY OF CLOCK SIGNAL

BACKGROUND OF THE INVENTION

1. Field of the Invention

The present invention generally relates to semiconductor integrated circuits, and particularly relates to a semiconductor integrated circuit equipped with a clock control circuit for starting and stopping the supply of a clock signal to an internal circuit. The present invention further relates to a clock control method that starts and stops the supply of a clock signal to an internal circuit.

2. Description of the Related Art

In large-scale logic circuits such as semiconductor integrated circuits, a technology for controlling the supply of clock signals inside circuitry is important in terms of the reduction of power consumption. In particular, such technology is widely used for portable equipment, for which power consumption is a vital consideration.

In general, the control of starting and stopping of clock supply is not explicitly taken care of by the system, but rather the supply of clock signals is started and stopped in conjunction with the power-on and the power-off of the system. As the circuit size increases and portable equipment becomes ever widely used, standby power consumed by the load capacitance associated with clock wires becomes conspicuous and cannot be ignored. As a result, it has become routine to control the starting and stopping of clock signals by use of gated clocks.

In the related-art clock control, a clock control unit is connected to the bus of a micro-controller, and is used to control the starting and stopping of clock signals with respect to functional blocks connected to the bus. The clock control unit may be provided with registers corresponding to respective functional blocks, and the control of clock signals for the functional blocks is performed by using the micro-controller to store commands regarding clock supply and suspension in the respective registers.

In the control scheme as described above, the starting and stopping of clock signals are controlled at the timing that is indicated by the micro-controller. In order to control the clock signals in accordance with the start and stop of operations of the functional blocks, the micro-controller needs to check the operation status of individual functional blocks constantly. To achieve this, it is necessary to conduct polling to each functional block at short intervals. This is not practical. In practice, thus, a unit of control regarding the starting and stopping of clock supply is set to a relatively large logic circuit block, thereby making it feasible to control clocks at relatively long check cycles.

Now that a single LSI can accommodate several million gates because of the development of semiconductor manufacturing technology, it is common to implement an entire system on a single LSI. In such a configuration, a large number of functional blocks are provided inside the single LSI. In the related-art configuration as described above, it is difficult to reduce the block size of the unit of clock control and to control clocks at short processing intervals because of the processing load of the micro-controller. This is a factor that hampers efforts toward a reduction of power consumption.

Accordingly, there is a need for a semiconductor integrated circuit provided with a clock control circuit that effectively controls the starting and stopping of clock supply on a functional-block-specific basis, and a need for a clock-control method for controlling the starting and stopping of clock supply on a functional-block-specific basis.

SUMMARY OF THE INVENTION

It is a general object of the present invention to provide a semiconductor integrated circuit that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a semiconductor integrated circuit particularly pointed out in the specification in such full, clear, concise, and exact terms as to enable a person having ordinary skill in the art to practice the invention.

To achieve these and other advantages and in accordance with the purpose of the invention, as embodied and broadly described herein, a semiconductor integrated circuit according to the present invention includes a plurality of functional blocks, each of which starts and stops an operation thereof in response to assertion and negation, respectively, of a corresponding command signal, a clock generation circuit which generates a clock signal, a clock control circuit which starts supplying the clock signal to each of the functional blocks in response to the assertion of the corresponding command signal, and stops supplying the clock signal to each of the functional blocks in response to the negation of the corresponding command signal.

In the semiconductor integrated circuit described above, the control of starting and stopping of clock supply to each block is carried out in response to a command signal corresponding to each block that orders the starting and stopping of an operation of each block. In this configuration, it is not the micro-controller that determines the start and halt timing of clock supply. Because of this, even when the unit of clock control is reduced in size to increase the number of blocks, the micro-controller will not suffer an increase of the load. Further, the timing of starting and stopping of clock supply can be diligently controlled to reflect the start and halt of actual operations of functional blocks, regardless of processing cycles of the micro-controller.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
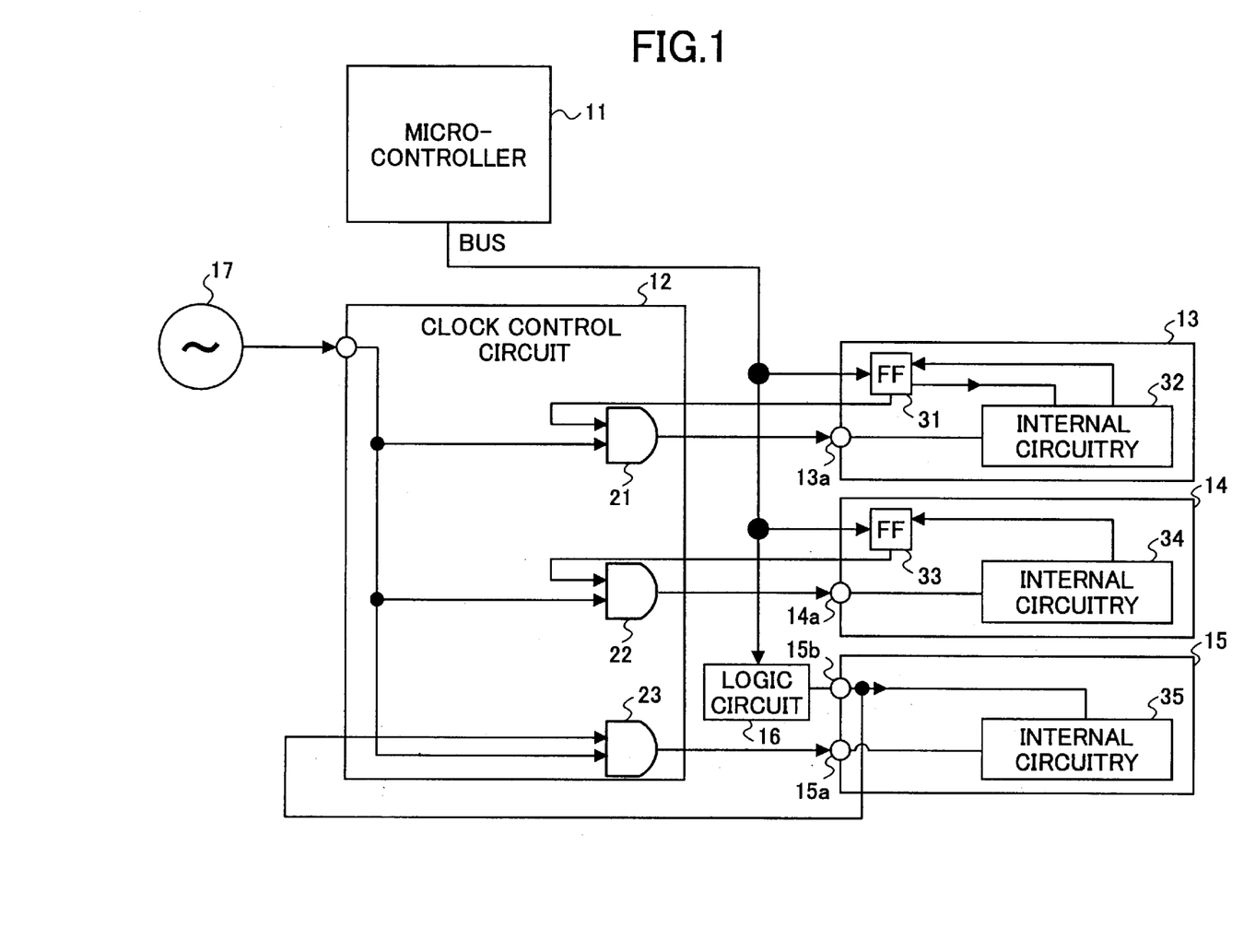
FIG. 1 is a block diagram of an example of a semiconductor integrated circuit according to the present invention.

FIG. 1 is a block diagram of an example of a semiconductor integrated circuit according to the present invention.

The semiconductor integrated circuit of FIG. 1 includes a micro-controller 11, a clock control circuit 12, logic blocks 13 through 15, a logic circuit 16, and a clock generation circuit 17. The clock control circuit 12 includes AND circuits 21 through 23. The logic block 13 includes a command register (for example, flip-flop) 31 and an internal circuitry 32. The logic block 14 includes a command register (for example, flip-flop) 33 and an internal circuitry 34. Further, the logic block 15 includes an internal circuitry 35.

When the micro-controller 11 issues a start command to the logic blocks 13 and 14, "1" will be set to the command registers 31 and 33 of the logic blocks 13 and 14, respectively. When the micro-controller 11 issues a start command to the logic circuit 16, the logic circuit 16 will start an operation. The logic circuits 16 are comprised of a timer, a sequencer, and so on, and operates according to a predetermined sequence to assert an enable signal to an operation enable terminal 15b of the logic block 15 at proper timing.

The AND circuit 21 of the clock control circuit 12 receives as one input thereof the setting data stored in the command register 31, and receives as the other input thereof a clock signal supplied from the clock generation circuit 17. When the setting data stored in the command register 31 is "1", the clock control circuit 12 supplies the clock signal generated by the clock generation circuit 17 to the clock supply terminal 13a of the logic block 13. The internal circuitry 32 of the logic block 13 starts an operation in response to the setting data "1" of the command register 31, and operates in synchronization with the clock signal supplied from the clock supply terminal 13a. After completion of the operation, the internal circuitry 32 issues an operation completion flag, thereby resetting the command register 31 to "0".

When the command register 31 is reset to "0", one input of the AND circuit 21 in the clock control circuit 12 is set to "0", and the supply of a clock signal to the clock supply terminal 13a of the logic block 13 will be stopped.

The AND circuit 22 of the clock control circuit 12 receives as one input thereof the setting data stored in the command register 33, and receives as the other input thereof the clock signal supplied from the clock generation circuit 17. When the setting data stored in the command register 33 is "1", thus, the clock control circuit 12 supplies the clock signal generated by the clock generation circuit 17 to the clock supply terminal 14a of the logic block 14. The internal circuitry 34 of the logic block 14 starts an operation in response to the setting data "1" of the command register 33, and operates in synchronization with the clock signal supplied from the clock supply terminal 14a. When the micro-controller 11 issues a halt command to the logic block 14, "0" will be set in the command register 33 of the logic block 14. In response to the setting data "0" of the command register 33, the internal circuitry 34 comes to a halt.

When the command register 33 is reset to "0", one input of the AND circuit 22 of the clock control circuit 12 is set to "0", and the supply of a clock signal to the clock supply terminal 14a of the logic block 14 will be stopped.

The AND circuit 23 of the clock control circuit 12 receives as one input thereof the enable signal supplied to the operation enable terminal 15b of the logic block 15, and further receives as the other input thereof the clock signal supplied from the clock generation circuit 17. When the enable signal supplied to the logic block 15 is asserted (e.g., "1"), the clock control circuit 12 supplies the clock signal generated by the clock generation circuit 17 to the clock supply terminal 15a of the logic block 15. The internal circuitry 35 of the logic block 15 starts an operation in response to the asserted enable signal, and operates in synchronization with the clock signal supplied from the clock supply terminal 15a. When the logic circuit 16 sets the enable signal to a negated state after the completion of a predetermined sequence, the internal circuitry 35 will end its operation.

As the enable signal supplied to the operation enable terminal 15b switches into the negated state, one input of the AND circuit 23 of the clock control circuit 12 is set to "0", and the supply of a clock signal to the clock supply terminal 15a of the logic block 15 will be stopped.

In this manner, the starting and stopping of clock supply to each block is controlled in response to the signal (data) that is supplied to the terminal or stored in the command register of each block to order the starting and stopping of an operation. In this configuration, it is not the micro-controller that determines the start and halt timing of clock supply. Because of this, even when the unit of clock control is reduced in size to increase the number of blocks, the micro-controller will not suffer an increase of the load. Further, the timing of starting and stopping of clock supply can be diligently controlled to reflect the start and halt of actual operations of functional blocks, regardless of processing cycles of the micro-controller.

Figure 2:
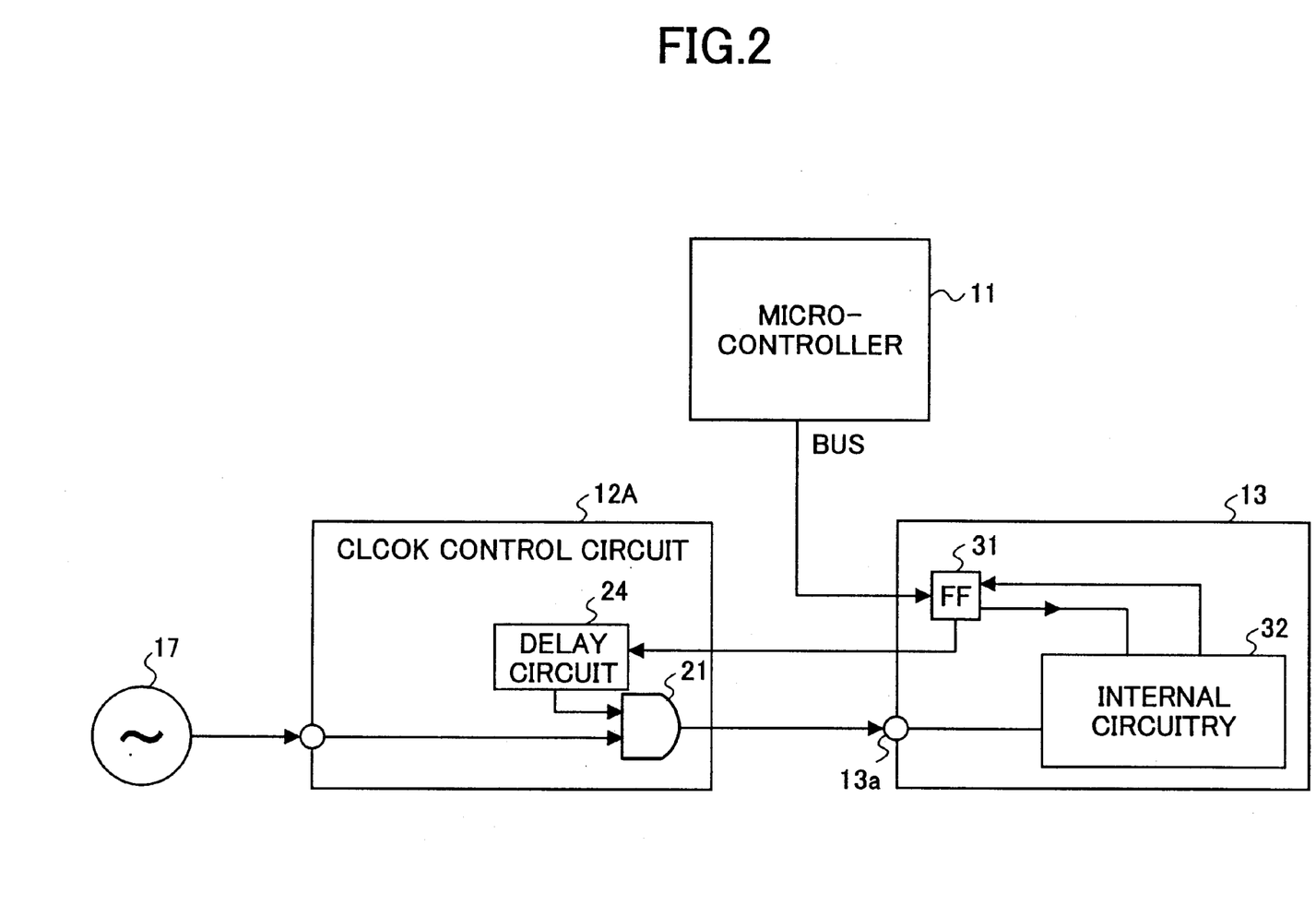
FIG. 2 is a block diagram showing a variation of the semiconductor integrated circuit according to the present invention.

FIG. 2 is a block diagram showing a variation of the semiconductor integrated circuit according to the present invention. In FIG. 2, the same elements as those of FIG. 1 will be referred to by the same numerals.

The semiconductor integrated circuit of FIG. 2 includes the micro-controller 11, a clock control circuit 12A, the logic block 13, and the clock generation circuit 17. The clock control circuit 12A includes an AND circuit 21 and a delay circuit 24. The logic block 13 includes the command register 31 and the internal circuitry 32.

When the micro-controller 11 issues a start command to the logic block 13, "1" will be set in the command register 31 of the logic block 13.

The AND circuit 21 of the clock control circuit 12A receives as one input thereof the setting data of the command register 31 that has undergone a predetermined time delay by the delay circuit 24, and further receives as the other input thereof the clock signal supplied from the clock generation circuit 17. When the setting data stored in the command register 31 is set to "1", the clock control circuit 12A starts supplying the clock signal generated by the clock generation circuit 17 to the clock supply terminal 13a of the logic block 13 with the predetermined time delay corresponding to the delay time of the delay circuit 24. The internal circuitry 32 of the logic block 13 starts an operation in response to the setting data "1" of the command register 31, and operates in synchronization with the clock signal supplied from the clock supply terminal 13a. After completion of the operation, the internal circuitry 32 issues an operation completion flag, thereby resetting the command register 31 to "0".

When the command register 31 is reset to "0", one input of the AND circuit 21 of the clock control circuit 12A is set to "0" with the predetermined time delay corresponding to the delay time of the delay circuit 24, and the supply of a clock signal to the clock supply terminal 13a of the logic block 13 will be stopped.

It is a general configuration that an operation completion flag is issued to the command register 31 by a control circuit or the like of the internal circuitry 32. In such a configuration, an actual operation may not have come to an end by the time when the control circuit of the internal circuitry 32 detects the completion of an operation and issues an operation completion flag. Valid data may still exist in circuit elements such as flip-flops inside the internal circuitry 32, and the operation will actually come to an end only when such remaining data is output a few cycles later. If the supply of a clock signal is immediately stopped in this case, the operation of outputting data or the like cannot be completed properly.

In the configuration of FIG. 2, the delay circuit 24 is provided in the clock control circuit by taking into account a processing delay from the time of resetting the command register 31 in response to an operation completion flag to the time of actual completion of the operation. The delay circuit 24 is then used to delay the setting data of the command register 31, thereby absorbing the processing delay. This configuration can also be applied to the logic block 14 or the logic block 15 shown in FIG. 1. The delay time of the delay circuit 24 is set in advance to a predetermined time length that reflects the time difference between the resetting of the command register 31 and the actual completion of an operation. The adjustment of the delay time is made by changing the number of delay elements included in the delay element series. The delay by the delay circuit 24 also serves to compensate for processing delays at the start of an operation that exists from the time of setting the command register 31 to the time of an actual start of the internal circuitry 32.

In this manner, a delay circuit is provided in a configuration in which the starting and stopping of clock supply to each block is controlled in response to the signal (data) that is supplied to the terminal or stored in the command register of each block to order the starting and stopping of an operation. This delay circuit delays the signal to be stored in the command register or the signal to be supplied to the terminal, thereby controlling the starting and stopping of clock supply while compensating for the processing delay of an internal circuitry inside a functional block.

Figure 3:
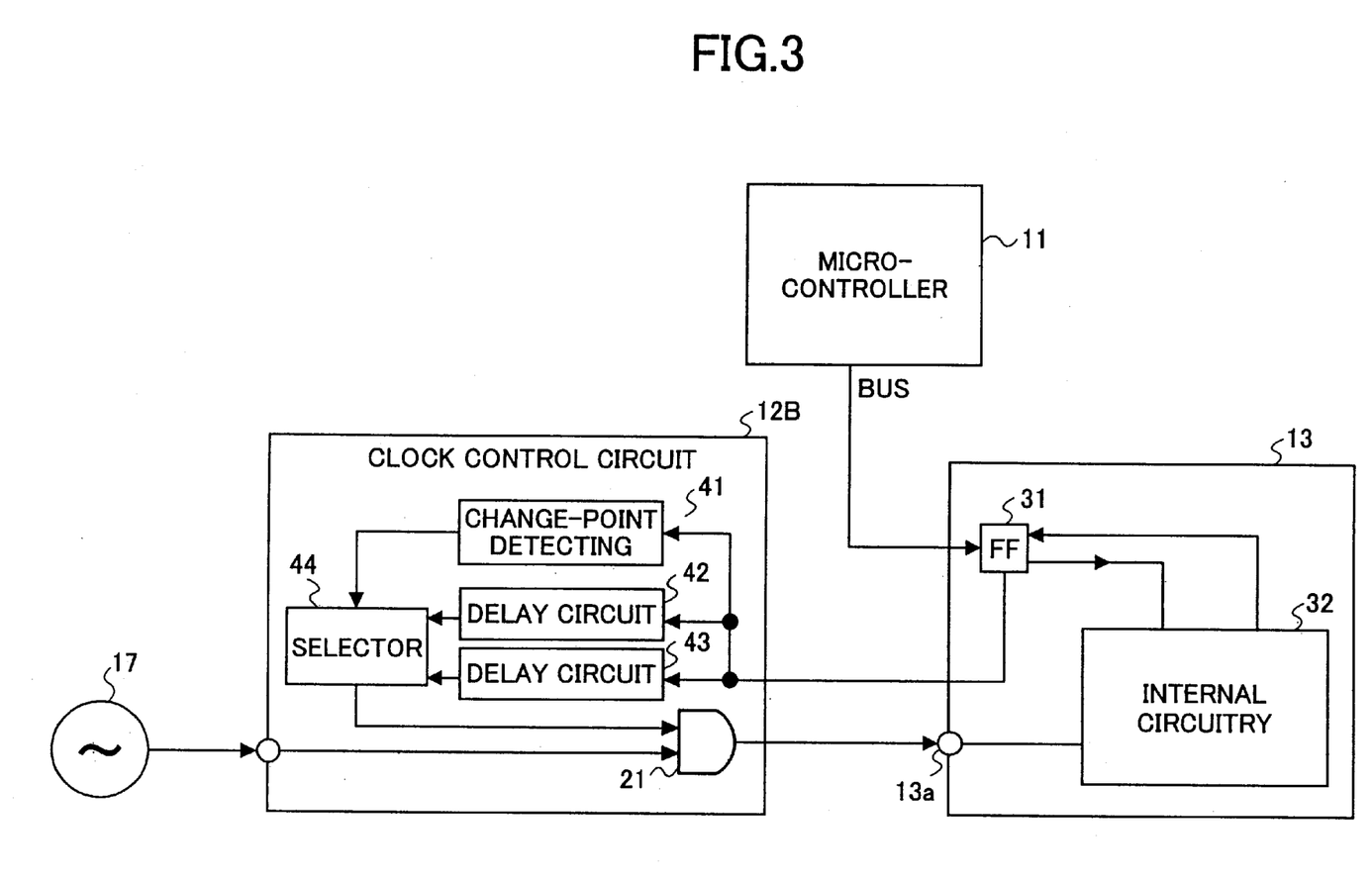
FIG. 3 is a block diagram showing a variation of the semiconductor integrated circuit according to the present invention.

FIG. 3 is a block diagram showing a variation of the semiconductor integrated circuit according to the present invention. In FIG. 3, the same elements as those of FIG. 1 will be referred to by the same numerals.

The semiconductor integrated circuit of FIG. 3 includes the micro-controller 11, a clock control circuit 12B, the logic block 13, and the clock generation circuit 17. The clock control circuit 12B includes an AND circuit 21, a change-point detecting circuit 41, delay circuits 42 and 43, and a selector 44. The logic block 13 includes the command register 31 and the internal circuitry 32.

The change-point detecting circuit 41 of the clock control circuit 12B checks whether a data change of the command register 31 is from "0" to "1" or is from "1" to "0".

Figure 4:
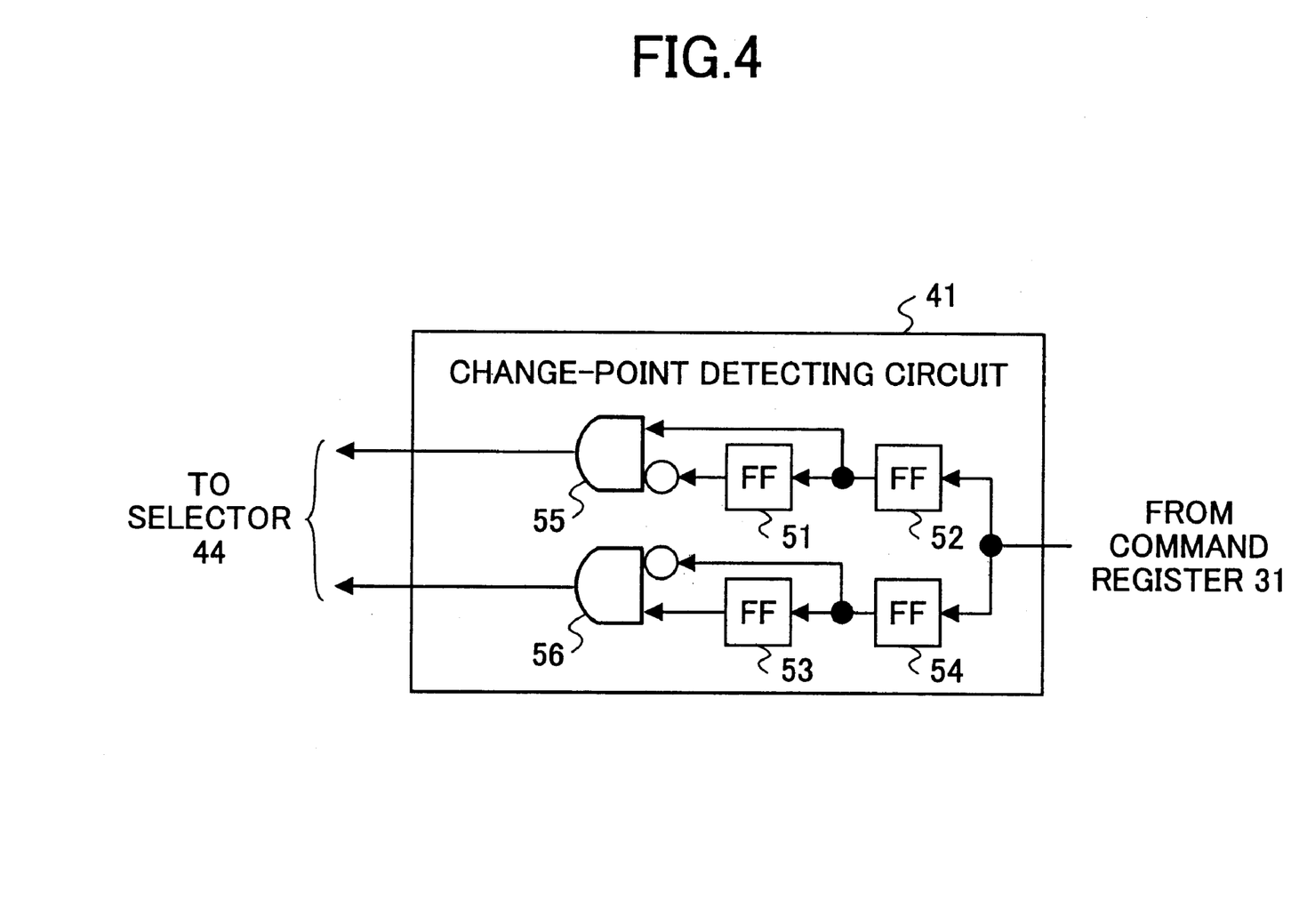
FIG. 4 is a circuit diagram showing an example of a circuit configuration of a change-point detecting circuit.

FIG. 4 is a circuit diagram showing an example of a circuit configuration of the change-point detecting circuit 41.

The change-point detecting circuit 41 of FIG. 4 includes flip-flops 51 through 54 and AND circuits 55 and 56. Each of the AND circuits 55 and 56 has one input thereof serving as a negative logic input. When the data of the command register 31 changes from "0" to "1", the flip-flops 51 and 53 store "0" therein, and the outputs thereof are set to 0. Further, the flip-flops 52 and 54 store "1" therein, and the outputs thereof are set to 1. Accordingly, the outputs of the AND circuits 55 and 56 become 1 and 0, respectively, which are supplied to the selector 44. When the data of the command register 31 changes from "1" to "0", the flip-flops 51 and 53 store "1" therein, and the outputs thereof are set to 1. Further, the flip-flops 52 and 54 store "0" therein, and the outputs thereof are set to 0. Accordingly, the outputs of the AND circuits 55 and 56 become 0 and 1, respectively, which are supplied to the selector 44.

With reference to FIG. 3 again, the selector 44 responsive to the change-point detection by the change-point detecting circuit 41 selects one of the outputs of the delay circuit 42 and the delay circuit 43, and supplies the selected output to an input of the AND circuit 21. The delay circuits 42 and 43 have respective delay times that are different from each other, and receive the setting data of the command register 31. Accordingly, the setting data of the command register 31 incurs a delay that corresponds to the delay circuit selected by the selector 44, and is supplied to the above-mentioned input of the AND circuit 21. The other input of the AND circuit 21 receives a clock signal supplied from the clock generation circuit 17.

Figure 5:
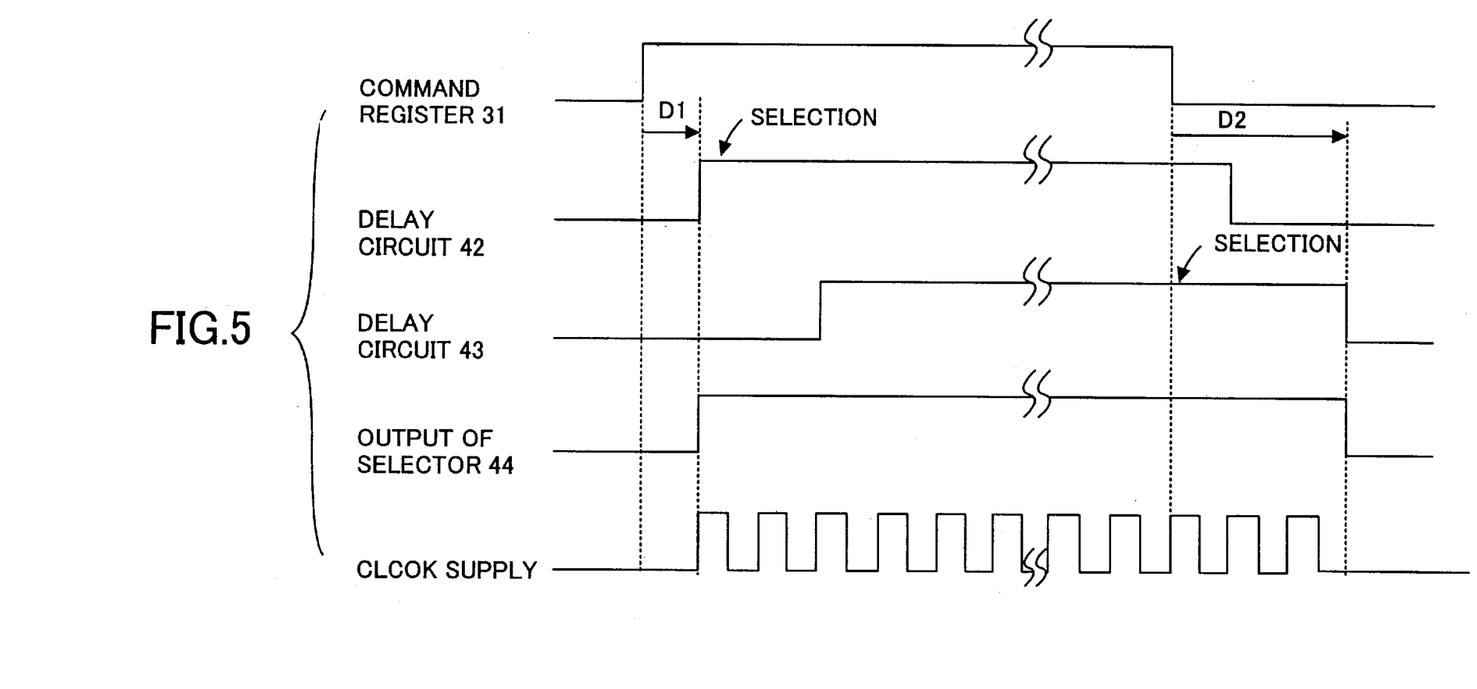
FIG. 5 is a signal timing chart for explaining operations of a clock control circuit.

FIG. 5 is a signal timing chart for explaining operations of the clock control circuit 12B.

When the micro-controller 11 issues a start command to the logic block 13, "1" will be set in the command register 31 of the logic block 13. In response to a situation in which the setting data stored in the command register 31 changes from "0" to "1" as in this case, the selector 44 selects the output of the delay circuit 42 (delay time D1), and supply the selected output to the AND circuit 21. After the predetermined time period controlled by the delay time of the delay circuit 42, the clock control circuit 12B start supplying the clock signal generated by the clock generation circuit 17 to the clock supply terminal 13a of the logic block 13. The internal circuitry 32 of the logic block 13 is activated in response to the setting data "1" of the command register 31, and operates in synchronization with the clock signal supplied from the clock supply terminal 13a. After completion of the operation, the internal circuitry 32 issues an operation completion flag, thereby resetting the command register 31 to "0".

The resetting to "0" of the command register 31 corresponds to a change from "1" to "0" in the setting data stored in the command register 31, so that the selector 44 selects the output of the delay circuit 43 (delay time D2), and supplies the selected output to the AND circuit 21. After a predetermined time period controlled by the delay time of the delay circuit 43, one input of the AND circuit 21 in the clock control circuit 12B is set to "0", resulting in the clock supply to the clock supply terminal 13a of the logic block 13 being stopped.

As previously described, an actual operation of the internal circuitry 32 is delayed compared with the setting data of the command register 31. That is, at the start of an operation, a processing delay is observed relative to the timing at which "1" is stored in the command register 31, and, at the end of an operation, another processing delay exists relative to the timing at which "0" is set in the command register 31. The processing delay at the time start of an operation and the processing delay at the end of an operation are not necessarily the same. It is thus desirable to change the clock control timing by the clock control circuit 12B between the start of an operation and the end of an operation according to the configuration and characteristics of the internal circuitry 32 of the logic block 13.

In the configuration of FIG. 3, the change-point detecting circuits 41 determines whether the command register 31 has changed from "0" to "1" or has changed from "1" to "0", and selects the output of the delay circuit 42 or the output of the delay circuit 43 by using the selector 44 according to this determination. In this manner, the setting data of the command register 31 is delayed by a delay length corresponding to the selected delay circuit, so that it is possible to properly absorb both the processing delay at the start of an operation and the processing delay at the end of an operation. This configuration can also be applied to the logic block 14 or the logic block 15 shown in FIG. 1. It should be noted that the delay times of the delay circuits 42 and 43 are set to respective time lengths corresponding to the processing delay at the start of an operation and the processing delay at the end of an operation by adjusting the number of delay elements in the delay series.

In this manner, the signal supplied to the terminal or stored in the command register is delayed by selected delay lengths in a configuration in which the starting and stopping of clock supply to each block is controlled in response to the signal (data) that is supplied to the terminal or stored in the command register of each block to order the starting and stopping of an operation. This makes it possible to control the starting and stopping of clock supply at different timings between the start of an operation and the end of an operation so as to compensate for the processing delay of an internal circuitry inside a functional block that is different between the start of an operation and the end of an operation.

Figure 6:
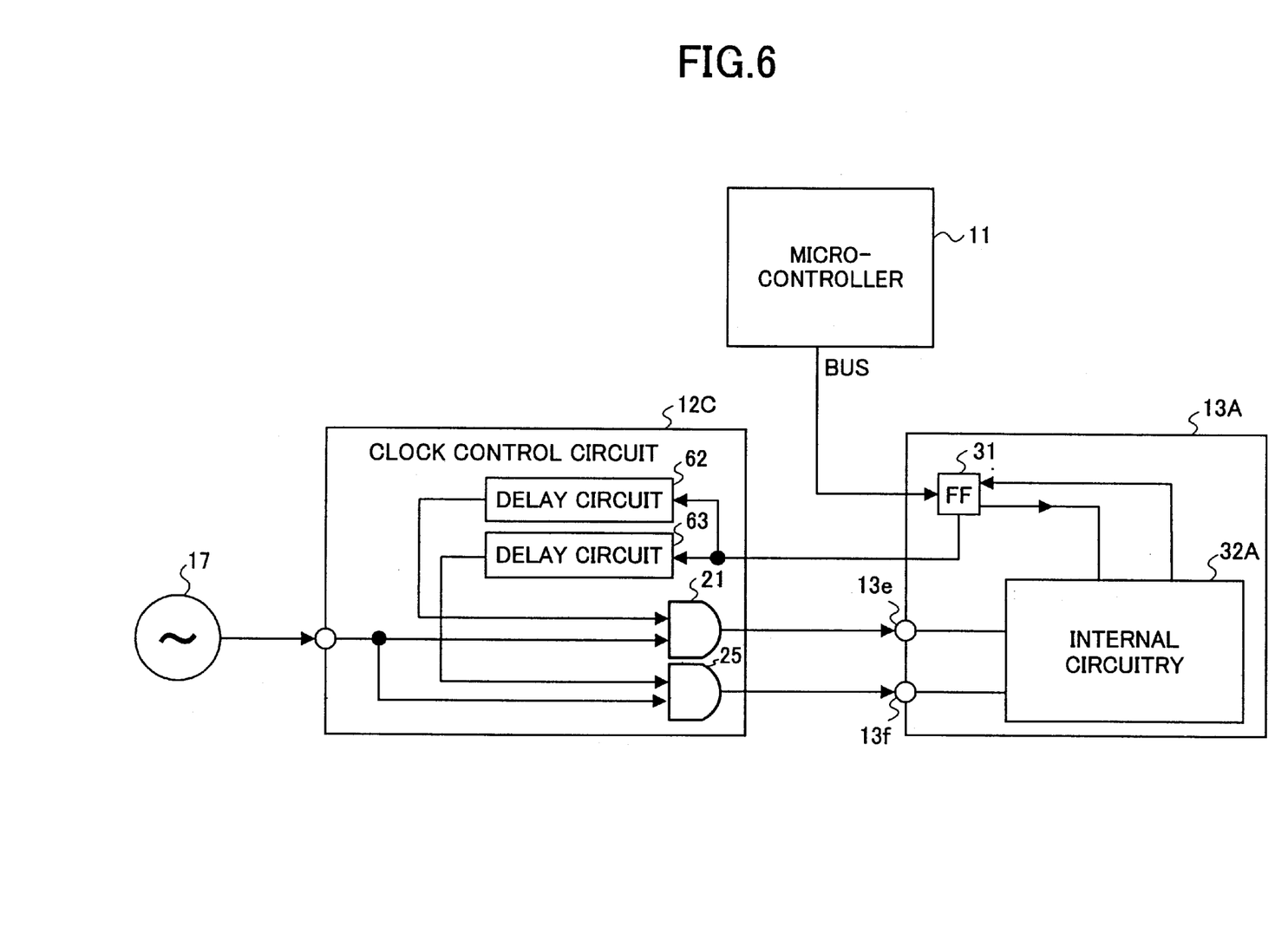
FIG. 6 is a block diagram showing a variation of the configuration of the semiconductor integrated circuit according to the present invention.

FIG. 6 is a block diagram showing a variation of the configuration of the semiconductor integrated circuit according to the present invention. In FIG. 6, the same elements as those of FIG. 1 are referred to by the same reference numerals.

The semiconductor integrated circuit of FIG. 6 includes the micro-controller 11, a clock control circuit 12C, the logic block 13A, and the clock generation circuit 17. The clock control circuit 12C includes the AND circuit 21, the AND circuit 25, and delay circuits 62 and 63. The logic block 13A includes the command register 31 and an internal circuitry 32A.

When the micro-controller 11 issues a start command to the logic block 13A, "1" will be set to the command register 31 of the logic block 13A.

The AND circuit 21 of the clock control circuit 12C receives at one input thereof the setting data stored in the command register 31 that is delayed by a predetermined delay length by the delay circuit 62, and receives at the other input thereof the clock signal supplied from the clock generation circuit 17. When the setting data stored in the command register 31 is set to "1", the clock control circuit 12C starts supplying the clock signal generated by the clock generation circuit 17 to the clock supply terminal 13e of the logic block 13A after the predetermined time period controlled by the delay time of the delay circuit 62. By the same token, the AND circuit 25 of the clock control circuit 12C receives at one input thereof the setting data stored in the command register 31 that is delayed by a predetermined delay length by the delay circuit 63, and receives at the other input thereof the clock signal supplied from the clock generation circuit 17. When the setting data stored in the command register 31 is set to "1", the clock control circuit 12C starts supplying the clock signal generated by the clock generation circuit 17 to the clock supply terminal 13f of the logic block 13A after the predetermined time period controlled by the delay time of the delay circuit 63.

The internal circuitry 32A of the logic block 13A is activated in response to the setting data "1" of the command register 31, and operates in synchronization with the clock signals supplied from the clock supply terminals 13e and 13f. After completion of the operation, the internal circuitry 32A issues an operation completion flag, thereby resetting the command register 31 to "0".

Resetting to "0" of the command register 31 stops the supply of a clock signal to the clock supply terminal 13e of the logic block 13A after the predetermined time period corresponding to the delay time of the delay circuit 62. Further, the supply of a clock signal to the clock supply terminal 13f of the logic block 13A is stopped after the predetermined time period corresponding to the delay time of the delay circuit 63. This configuration is also applicable to the logic block 14 or the logic block 15 shown in FIG. 1.

In this manner, the signal supplied to the terminal or stored in the command register is delayed by a plurality of delay circuits having different delay lengths in a configuration in which the starting and stopping of clock supply to each block is controlled in response to the signal (data) that is supplied to the terminal or stored in the command register of each block to order the starting and stopping of an operation. This makes it possible to supply a plurality of clock signals to a functional block at respective clock-start and clock-halt timings. It thus becomes possible to supply clock signals in accordance with the operation sequences of respective portions within the functional block, thereby achieving more diligent clock control operations.

Further, the present invention is not limited to these embodiments, but various variations and modifications may be made without departing from the scope of the present invention.

The present application is based on Japanese priority application No. 2001-258710 filed on Aug. 28, 2001, with the Japanese Patent Office, the entire contents of which are hereby incorporated by reference.

What is claimed is:

1. A semiconductor integrated circuit, comprising:
   a plurality of functional blocks, each of which starts and stops an operation thereof in response to assertion and negation, respectively, of a corresponding command signal;
   a clock generation circuit which generates a clock signal;
   a clock control circuit which starts supplying the clock signal to each of said functional blocks in response to the assertion of the corresponding command signal, and stops supplying the clock signal to each of said functional blocks in response to the negation of the corresponding command signal; and
   a controller which controls the command signal with respect to each of said functional blocks,
   wherein at least one of said functional blocks includes a register that stores therein the corresponding command signal, said controller setting the command signal in said register to a state of assertion, said at least one of said functional blocks resetting the command signal in said register to a state of negation upon completion of an operation of said at least one of said functional blocks.

2. The semiconductor integrated circuit as claimed in claim 1, wherein said clock control circuit controls starting and stopping of supply of the clock signal to said at least one of said functional blocks in accordance with a state of said register.

3. The semiconductor integrated circuit as claimed in claim 1, wherein said clock control circuit delays the command signal with respect to at least one of said functional blocks, and controls starting and stopping of supply of the clock signal to said at least one of said functional blocks in accordance with a state of the delayed command signal.

4. The semiconductor integrated circuit as claimed in claim 1, wherein said clock control circuit delays the command signal by a first delay with respect to at least one of said functional blocks, and starts supplying the clock signal to said at least one of said functional blocks in accordance with a state of the command signal delayed by the first delay, and wherein said clock control circuit delays the command signal by a second delay with respect to said at least one of said functional blocks, and stops supplying the clock signal to said at least one of said functional blocks in accordance with a state of the command signal delayed by the second delay.

5. The semiconductor integrated circuit as claimed in claim 1, wherein said clock control circuit delays the command signal by a first delay with respect to at least one of said functional blocks, and supplies to said at least one of said functional blocks the clock signal having start and stop timings that are controlled in accordance with a state of the command signal delayed by the first delay, and wherein said clock control circuit delays the command signal by a second delay with respect to said at least one of said functional blocks, and supplies to said at least one of said functional blocks another one of the clock signal having start and stop timings that are controlled in accordance with a state of the command signal delayed by the second delay.

6. The semiconductor integrated circuit as claimed in claim 1, wherein at least one of said functional blocks has the corresponding command signal that is asserted and negated according to a predetermined operation sequence of a predetermined circuit.

7. A method of controlling a clock, comprising the steps of:

generating a clock signal that is to be supplied to a plurality of functional blocks, each of which starts and stops an operation thereof in response to assertion and negation, respectively, of a corresponding command signal;

starting supplying the clock signal to each of said functional blocks in response to the assertion of the corresponding command signal;

stopping supplying the clock signal to each of said functional blocks in response to the negation of the corresponding command signal; and delaying the command signal, wherein said step of starting supplying the clock signal starts supplying the clock signal in response to the assertion of the delayed command signal, and said step of stopping supplying the clock signal stops supplying the clock signal in response to the negation of the delayed command signal.

8. A method of controlling a clock, comprising the steps of:

generating a clock signal that is to be supplied to a plurality of functional blocks, each of which starts and stops an operation thereof in response to assertion and negation, respectively, of a corresponding command signal;

starting supplying the clock signal to each of said functional blocks in response to the assertion of the corresponding command signal;

stopping supplying the clock signal to each of said functional blocks in response to the negation of the corresponding command signal; and delaying the command signal by a first delay length and delaying the command signal by a second delay length, wherein said step of starting supplying the clock signal starts supplying the clock signal in response to the assertion of the command signal delayed by the first delay length, and said step of stopping supplying the clock signal stops supplying the clock signal in response to the negation of the command signal delayed by the second delay length.

9. A method of controlling a clock, comprising the steps of:

generating a clock signal that is to be supplied to a plurality of functional blocks, each of which starts and stops an operation thereof in response to assertion and negation, respectively, of a corresponding command signal;

starting supplying the clock signal to each of said functional blocks in response to the assertion of the corresponding command signal;

stopping supplying the clock signal to each of said functional blocks in response to the negation of the corresponding command signal; and delaying the command signal by a first delay length and delaying the command signal by a second delay length, wherein said step of starting supplying the clock signal and said step of stopping supplying the clock signal supply the clock signal having start and stop timings that are controlled in accordance with a state of the command signal delayed by the first delay length, and supply another one of the clock signal having start and stop timings that are controlled in accordance with a state of the command signal delayed by the second delay length.

* * * * *